(12) United States Patent
Derelov et al.

(10) Patent No.: US 11,445,820 B2
(45) Date of Patent: *Sep. 20, 2022

(54) PANELS COMPRISING A MECHANICAL LOCKING DEVICE AND AN ASSEMBLED PRODUCT COMPRISING THE PANELS

(71) Applicant: Välinge Innovation AB, Viken (SE)

(72) Inventors: Peter Derelov, Helsingborg (SE); Christian Boo, Kagerod (SE)

(73) Assignee: VALINGE INNOVATION AB, Viken (SE)

( * ) Notice: Subject to any disclaimer, the term of this patent is extended or adjusted under 35 U.S.C. 154(b) by 112 days.

This patent is subject to a terminal disclaimer.

(21) Appl. No.: 16/722,096

(22) Filed: Dec. 20, 2019

(65) Prior Publication Data

US 2020/0121076 A1    Apr. 23, 2020

Related U.S. Application Data

(63) Continuation of application No. 15/415,356, filed on Jan. 25, 2017, now Pat. No. 10,548,397.

(30) Foreign Application Priority Data

Jan. 26, 2016    (SE) .................................. 1650089-4

(51) Int. Cl.
*F16B 12/12*    (2006.01)
*A47B 47/04*    (2006.01)
(Continued)

(52) U.S. Cl.
CPC .......... *A47B 47/042* (2013.01); *F16B 12/125* (2013.01); *F16B 12/26* (2013.01);
(Continued)

(58) Field of Classification Search
CPC ...... Y10T 403/72; F16B 12/12; F16B 12/125; F16B 12/20; F16B 12/26; F16B 12/46;
(Continued)

(56) References Cited

U.S. PATENT DOCUMENTS 291,032 A    1/1884   Cleland
634,581 A    10/1899  Miller
(Continued)

FOREIGN PATENT DOCUMENTS

AT    400 611 B     2/1996
CH    365 507 A     11/1962
(Continued)

OTHER PUBLICATIONS

U.S. Appl. No. 17/119,392, Jimmie Bruno and Zoran Simunic, filed Dec. 11, 2020.
(Continued)

*Primary Examiner* — Michael P Ferguson
(74) *Attorney, Agent, or Firm* — Buchanan Ingersoll & Rooney P.C.

(57) ABSTRACT

A set of panels including a first panel with a first main plane and a second panel with a second main plane. The first and the second panel are provided with a mechanical locking device for locking a first edge of the first panel to a second edge of the second panel at a junction plane, wherein the first main plane is essentially perpendicular to the second main plane and the junction plane is extending between the first main plane and the second main plane. The first edge includes an edge tongue that extends from the junction plane. The second edge includes an edge groove at the junction plane. The edge tongue is configured to cooperate with the edge groove for locking together the first and the second edges in a first direction which is perpendicular to the first main plane. The edge tongue includes a tongue groove.

11 Claims, 4 Drawing Sheets

(51) Int. Cl.
  *F16B 12/46*  (2006.01)
  *F16B 12/26*  (2006.01)
  *A47B 88/90*  (2017.01)

(52) U.S. Cl.
  CPC ............ *F16B 12/46* (2013.01); *A47B 88/941* (2017.01); *A47B 2088/902* (2017.01); *F16B 2012/466* (2013.01); *Y10T 403/72* (2015.01)

(58) Field of Classification Search
  CPC ......... F16B 2012/145; F16B 2012/466; A47B 47/0075; A47B 47/0091; A47B 47/045; A47B 47/047; A47B 96/201; A47B 2230/0074; A47B 2230/0077; A47B 2230/0081
  See application file for complete search history.

(56) References Cited

U.S. PATENT DOCUMENTS

| | | |
|---|---|---|
| 701,000 A | 5/1902 | Ahrens |
| 861,911 A | 7/1907 | Stewart |
| 881,673 A | 3/1908 | Ellison |
| 1,533,099 A | 4/1925 | Carroll |
| 1,534,468 A | 4/1925 | Shea, Jr. |
| 1,800,386 A | 4/1931 | Hoffman |
| 1,800,387 A | 4/1931 | Greist |
| 1,802,245 A | 4/1931 | Foretich |
| 1,954,242 A | 4/1934 | Heppenstall |
| 2,360,451 A | 10/1944 | Stone |
| 2,362,904 A | 11/1944 | Kramer |
| 2,496,184 A | 1/1950 | Von Canon |
| 2,681,483 A | 6/1954 | Morawetz |
| 3,002,630 A | 10/1961 | Heisser |
| 3,195,968 A | 7/1965 | Freeman |
| 3,284,152 A | 11/1966 | Schörghuber |
| 3,313,054 A | 4/1967 | Madey |
| 3,347,610 A | 10/1967 | Pilliod |
| 3,410,441 A | 11/1968 | Rhyne |
| 3,722,704 A | 3/1973 | Piretti |
| 3,722,971 A | 3/1973 | Zeischegg |
| 3,742,807 A | 7/1973 | Manning |
| 3,765,465 A | 10/1973 | Gulistan |
| 3,784,271 A | 1/1974 | Schreiber |
| 3,884,002 A | 5/1975 | Logie |
| 3,885,845 A | 5/1975 | Krieks |
| 3,981,118 A | 9/1976 | Johnson et al. |
| 4,089,614 A | 5/1978 | Harley |
| 4,099,293 A | 7/1978 | Pittasch |
| 4,099,887 A | 7/1978 | Mackenroth |
| 4,116,510 A | 9/1978 | Franco |
| 4,142,271 A | 3/1979 | Busse |
| 4,211,379 A | 7/1980 | Morgan et al. |
| 4,222,544 A | 9/1980 | Crowder |
| 4,279,397 A | 7/1981 | Larsson |
| 4,299,067 A | 11/1981 | Bertschi |
| 4,308,961 A | 1/1982 | Kunce |
| 4,324,517 A | 4/1982 | Dey |
| 4,403,886 A | 9/1983 | Haeusler |
| 4,405,253 A | 9/1983 | Stockum |
| 4,509,648 A | 4/1985 | Govang |
| 4,593,734 A | 6/1986 | Wallace |
| 4,595,105 A | 6/1986 | Gold |
| 4,597,122 A | 7/1986 | Handler |
| 4,615,448 A | 10/1986 | Johnstonbaugh |
| 4,629,076 A | 12/1986 | Amstutz et al. |
| 4,750,794 A | 6/1988 | Vegh |
| 4,752,150 A | 6/1988 | Salice |
| 4,815,908 A | 3/1989 | Duran et al. |
| 4,817,900 A | 4/1989 | Whittington et al. |
| 4,844,266 A | 7/1989 | Small et al. |
| 4,883,331 A | 11/1989 | Mengel |
| 4,886,326 A | 12/1989 | Kuzyk |
| 4,888,933 A | 12/1989 | Guomundsson |
| 4,891,897 A | 1/1990 | Gieske et al. |
| 4,909,581 A | 3/1990 | Haheeb |
| 4,938,625 A | 7/1990 | Matsui |
| 4,944,416 A | 7/1990 | Petersen et al. |
| 4,961,295 A | 10/1990 | Kosch, Sr. et al. |
| 5,004,116 A | 4/1991 | Cattarozzi |
| 5,018,323 A | 5/1991 | Clausen |
| 5,109,993 A | 5/1992 | Hutchison |
| 5,114,265 A | 5/1992 | Grisley |
| 5,121,578 A | 6/1992 | Holz |
| 5,125,518 A | 6/1992 | Ward |
| 5,138,803 A | 8/1992 | Grossen |
| 5,209,556 A | 5/1993 | Anderson |
| 5,212,925 A | 5/1993 | McClinton |
| 5,299,509 A | 4/1994 | Ballard |
| 5,360,121 A | 11/1994 | Sothman |
| 5,375,802 A | 12/1994 | Branham, II |
| 5,423,155 A | 6/1995 | Bauer |
| 5,451,102 A | 9/1995 | Chuan |
| 5,458,433 A | 10/1995 | Stastny |
| 5,471,804 A | 12/1995 | Winter, IV |
| 5,475,960 A | 12/1995 | Lindal |
| 5,499,667 A | 3/1996 | Nakanishi |
| 5,499,886 A | 3/1996 | Short et al. |
| 5,507,331 A | 4/1996 | Nakanishi |
| 5,527,103 A | 6/1996 | Pittman |
| 5,536,108 A | 7/1996 | Kvalheim |
| 5,658,086 A | 8/1997 | Brokaw et al. |
| 5,711,115 A | 1/1998 | Wirt |
| 5,775,521 A | 7/1998 | Tisbo |
| 5,810,505 A | 9/1998 | Henriott |
| 5,893,617 A | 4/1999 | Lee |
| 5,941,026 A | 8/1999 | Eisenreich |
| 5,944,294 A | 8/1999 | Baer |
| 5,950,389 A | 9/1999 | Porter |
| 6,045,290 A | 4/2000 | Nocievski |
| 6,050,426 A | 4/2000 | Leurdijk |
| 6,142,436 A | 11/2000 | Thurston et al. |
| 6,312,186 B1 | 11/2001 | Röck et al. |
| 6,349,507 B1 | 2/2002 | Muellerleile |
| 6,363,645 B1 | 4/2002 | Hunter |
| 6,413,007 B1 | 7/2002 | Lambright |
| 6,418,683 B1 | 7/2002 | Martensson |
| 6,491,172 B2 | 12/2002 | Chance |
| 6,505,452 B1 | 1/2003 | Hannig |
| 6,547,086 B1 | 4/2003 | Harvey |
| 6,578,498 B1 | 6/2003 | Draudt et al. |
| 6,675,979 B2 | 1/2004 | Taylor |
| D486,676 S | 2/2004 | Campbell et al. |
| 6,769,219 B2 | 8/2004 | Schwitte et al. |
| 6,772,890 B2 | 8/2004 | Campbell et al. |
| 6,827,028 B1 | 12/2004 | Callaway |
| 6,971,614 B2 | 12/2005 | Fischer et al. |
| 7,127,860 B2 | 10/2006 | Pervan |
| 7,223,045 B2 | 5/2007 | Migli |
| 7,228,977 B2 | 6/2007 | Perkins et al. |
| 7,300,120 B2 | 11/2007 | Shin |
| 7,451,535 B2 | 11/2008 | Wells et al. |
| 7,451,578 B2 | 11/2008 | Hannig |
| 7,584,583 B2 | 9/2009 | Bergelin et al. |
| 7,614,350 B2 | 11/2009 | Tuttle et al. |
| 7,621,092 B2 | 11/2009 | Groeke et al. |
| 7,641,414 B1 | 1/2010 | Joyce |
| 7,717,278 B2 | 5/2010 | Kao |
| 7,721,503 B2 | 5/2010 | Pervan et al. |
| 7,793,450 B2 | 9/2010 | Chasmer et al. |
| 7,818,939 B2 | 10/2010 | Bearinger |
| 7,998,549 B2 | 8/2011 | Susnjara |
| 8,033,074 B2 | 10/2011 | Pervan |
| 8,038,363 B2 | 10/2011 | Hannig |
| 8,042,311 B2 | 10/2011 | Pervan |
| 8,146,754 B2 | 4/2012 | Apgood |
| 8,220,217 B2 | 7/2012 | Muehlebach |
| 8,234,830 B2 | 8/2012 | Pervan |
| 8,365,499 B2 | 2/2013 | Nilsson et al. |
| 8,387,327 B2 | 3/2013 | Pervan |
| 8,464,408 B2 | 6/2013 | Hazzard |
| 8,495,849 B2 | 7/2013 | Pervan |
| 8,505,257 B2 | 8/2013 | Boo et al. |
| 8,544,230 B2 | 10/2013 | Pervan |

(56) References Cited

U.S. PATENT DOCUMENTS

| | | |
|---|---|---|
| 8,596,013 B2 | 12/2013 | Boo |
| 8,602,227 B1 | 12/2013 | McDonald |
| 8,615,952 B2 | 12/2013 | Engström |
| 8,713,886 B2 | 5/2014 | Pervan |
| 8,745,952 B2 | 6/2014 | Perra |
| 8,764,137 B2 | 7/2014 | Fehre |
| 8,776,473 B2 | 7/2014 | Pervan |
| 8,833,028 B2 | 9/2014 | Whispell et al. |
| 8,864,407 B1 | 10/2014 | Sorum |
| 8,882,416 B2 | 11/2014 | Baur et al. |
| 8,887,468 B2 | 11/2014 | Håkansson et al. |
| 9,175,703 B2 | 11/2015 | Maertens |
| 9,216,541 B2 | 12/2015 | Boo |
| 9,290,948 B2 | 3/2016 | Cappelle et al. |
| 9,375,085 B2 | 6/2016 | Derelöv |
| 9,538,842 B2 | 1/2017 | Håkansson et al. |
| 9,655,442 B2 | 5/2017 | Boo et al. |
| 9,700,157 B2 | 7/2017 | Keyvanloo |
| 9,714,672 B2 | 7/2017 | Derelöv et al. |
| 9,723,923 B2 | 8/2017 | Derelöv |
| 9,726,210 B2 | 8/2017 | Derelöv et al. |
| 9,745,756 B2 | 8/2017 | Hannig |
| 9,758,973 B2 | 9/2017 | Segaert |
| 9,763,528 B2 | 9/2017 | Lung |
| 9,809,983 B2 | 11/2017 | Trudel |
| 9,945,121 B2 | 4/2018 | Derelöv |
| 10,034,541 B2 | 7/2018 | Boo et al. |
| 10,202,996 B2 | 2/2019 | Håkansson et al. |
| 10,378,570 B2 | 8/2019 | Broughton |
| 10,415,613 B2 | 9/2019 | Boo |
| 10,448,739 B2 | 10/2019 | Derelöv et al. |
| 10,451,097 B2 | 10/2019 | Brännström et al. |
| 10,486,245 B2 | 11/2019 | Fridlund |
| 10,506,875 B2 | 12/2019 | Boo et al. |
| 10,544,818 B2 | 1/2020 | Fridlund |
| 10,548,397 B2 | 2/2020 | Derelöv et al. |
| 10,669,716 B2 | 6/2020 | Derelöv |
| 10,670,064 B2 | 6/2020 | Derelöv |
| 10,724,564 B2 | 7/2020 | Derelöv |
| 10,731,688 B2 | 8/2020 | Brännström et al. |
| 10,736,416 B2 | 8/2020 | Derelöv et al. |
| 10,830,266 B2 | 11/2020 | Fridlund |
| 10,830,268 B2 | 11/2020 | Boo |
| 10,871,179 B2 | 12/2020 | Hakansson et al. |
| 10,876,562 B2 | 12/2020 | Pervan |
| 10,876,563 B2 | 12/2020 | Derelöv et al. |
| 10,968,936 B2 | 4/2021 | Boo et al. |
| 11,076,691 B2 | 8/2021 | Boo |
| 11,083,287 B2 | 8/2021 | Boo et al. |
| 11,098,484 B2 | 8/2021 | Derelöv |
| 11,137,007 B2 | 10/2021 | Fridlund |
| 11,204,051 B2 | 12/2021 | Brännström et al. |
| 11,246,415 B2 | 2/2022 | Derelöv et al. |
| 2002/0170258 A1 | 11/2002 | Schwitte et al. |
| 2004/0165946 A1 | 8/2004 | Areh et al. |
| 2005/0042027 A1 | 2/2005 | Migli |
| 2005/0236544 A1 | 10/2005 | Mancino |
| 2005/0247653 A1 | 11/2005 | Brooks |
| 2006/0091093 A1 | 5/2006 | Armari |
| 2006/0101769 A1 | 5/2006 | Pervan et al. |
| 2006/0180561 A1 | 8/2006 | Wisnoski et al. |
| 2006/0236642 A1 | 10/2006 | Pervan |
| 2006/0273085 A1 | 12/2006 | Casto |
| 2007/0006543 A1 | 1/2007 | Engström |
| 2007/0028547 A1 | 2/2007 | Grafenauer et al. |
| 2007/0193178 A1 | 8/2007 | Groeke et al. |
| 2008/0010937 A1 | 1/2008 | Pervan et al. |
| 2008/0066415 A1 | 3/2008 | Pervan |
| 2008/0193209 A1 | 8/2008 | Henderson |
| 2008/0216435 A1 | 9/2008 | Nolan |
| 2008/0236088 A1 | 10/2008 | Hannig et al. |
| 2008/0244882 A1 | 10/2008 | Woxman et al. |
| 2009/0014401 A1 | 1/2009 | Tallman |
| 2009/0064624 A1 | 3/2009 | Sokol |
| 2010/0028592 A1 | 2/2010 | Barkdoll et al. |
| 2010/0083603 A1 | 4/2010 | Goodwin |
| 2010/0104354 A1 | 4/2010 | Spalding |
| 2010/0173122 A1 | 7/2010 | Susnjara |
| 2010/0289389 A1 | 11/2010 | Crabtree, II |
| 2011/0023303 A1 | 2/2011 | Pervan et al. |
| 2011/0225921 A1 | 9/2011 | Schulte |
| 2011/0225922 A1 | 9/2011 | Pervan et al. |
| 2011/0280655 A1 | 11/2011 | Maertens et al. |
| 2011/0283650 A1 | 11/2011 | Pervan et al. |
| 2012/0009383 A1 | 1/2012 | Hardesty |
| 2012/0027967 A1 | 2/2012 | Maertens et al. |
| 2012/0073235 A1 | 3/2012 | Hannig |
| 2012/0124932 A1 | 5/2012 | Schulte et al. |
| 2012/0145845 A1 | 6/2012 | Hightower |
| 2012/0180416 A1 | 7/2012 | Perra et al. |
| 2012/0279161 A1 | 11/2012 | Håkansson et al. |
| 2012/0286637 A1 | 11/2012 | Fehre |
| 2013/0014463 A1 | 1/2013 | Pervan |
| 2013/0048632 A1 | 2/2013 | Chen |
| 2013/0071172 A1 | 3/2013 | Maertens et al. |
| 2013/0081349 A1 | 4/2013 | Pervan |
| 2013/0097846 A1 | 4/2013 | Pettigrew |
| 2013/0111845 A1 | 5/2013 | Pervan |
| 2013/0170904 A1 | 7/2013 | Cappelle et al. |
| 2013/0232905 A2 | 9/2013 | Pervan |
| 2013/0287484 A1 | 10/2013 | Phillips |
| 2014/0013919 A1 | 1/2014 | Gerke et al. |
| 2014/0055018 A1 | 2/2014 | Shein et al. |
| 2014/0111076 A1 | 4/2014 | Devos |
| 2014/0286701 A1 | 9/2014 | Sauer |
| 2014/0294498 A1 | 10/2014 | Logan |
| 2015/0034522 A1 | 2/2015 | Itou et al. |
| 2015/0035422 A1 | 2/2015 | Håkansson et al. |
| 2015/0078807 A1 | 3/2015 | Brännström et al. |
| 2015/0078819 A1 | 3/2015 | Derelöv et al. |
| 2015/0196118 A1 | 7/2015 | Derelöv |
| 2015/0198191 A1 | 7/2015 | Boo |
| 2015/0230600 A1 | 8/2015 | Schulte |
| 2015/0330088 A1 | 11/2015 | Derelöv |
| 2015/0368896 A1 | 12/2015 | Schulte |
| 2016/0000220 A1 | 1/2016 | Devos |
| 2016/0007751 A1 | 1/2016 | Derelöv |
| 2016/0145029 A1 | 5/2016 | Ranade et al. |
| 2016/0174704 A1 | 6/2016 | Boo et al. |
| 2016/0186925 A1 | 6/2016 | Bettin |
| 2016/0192775 A1 | 7/2016 | Andersson |
| 2016/0270531 A1 | 9/2016 | Derelöv |
| 2017/0079433 A1 | 3/2017 | Derelöv et al. |
| 2017/0089379 A1 | 3/2017 | Pervan |
| 2017/0097033 A1 | 4/2017 | Håkansson et al. |
| 2017/0159291 A1 | 6/2017 | Derelöv |
| 2017/0208938 A1 | 7/2017 | Derelöv et al. |
| 2017/0227031 A1 | 8/2017 | Boo |
| 2017/0227032 A1 | 8/2017 | Fridlund |
| 2017/0227035 A1 | 8/2017 | Fridlund |
| 2017/0234346 A1 | 8/2017 | Fridlund |
| 2017/0298973 A1 | 10/2017 | Derelöv |
| 2017/0360193 A1 | 12/2017 | Boo et al. |
| 2018/0080488 A1 | 3/2018 | Derelöv |
| 2018/0087552 A1 | 3/2018 | Derelöv et al. |
| 2018/0112695 A1 | 4/2018 | Boo et al. |
| 2018/0119717 A1 | 5/2018 | Derelöv |
| 2018/0202160 A1 | 7/2018 | Derelöv |
| 2018/0283430 A1 | 10/2018 | Leistert |
| 2018/0328396 A1 | 11/2018 | Fransson et al. |
| 2019/0113061 A1 | 4/2019 | Håkansson et al. |
| 2019/0166989 A1 | 6/2019 | Boo et al. |
| 2019/0191870 A1 | 6/2019 | Derelöv |
| 2019/0195256 A1 | 6/2019 | Derelöv |
| 2019/0289999 A1 | 9/2019 | Derelöv et al. |
| 2019/0320793 A1 | 10/2019 | Boo |
| 2019/0323532 A1 | 10/2019 | Boo |
| 2019/0323533 A1 | 10/2019 | Boo |
| 2019/0323534 A1 | 10/2019 | Derelöv |
| 2019/0323535 A1 | 10/2019 | Derelöv |
| 2020/0003242 A1 | 1/2020 | Brännström et al. |
| 2020/0055126 A1 | 2/2020 | Fridlund |
| 2020/0069048 A1 | 3/2020 | Derelöv et al. |
| 2020/0069049 A1 | 3/2020 | Derelöv et al. |

(56) References Cited

U.S. PATENT DOCUMENTS

| | | |
|---|---|---|
| 2020/0102978 A1 | 4/2020 | Fridlund |
| 2020/0214447 A1 | 7/2020 | Derelöv et al. |
| 2020/0300284 A1 | 9/2020 | Pervan |
| 2020/0337455 A1 | 10/2020 | Boo et al. |
| 2020/0340513 A1 | 10/2020 | Derelöv |
| 2021/0079650 A1 | 3/2021 | Derelöv |
| 2021/0148392 A1 | 5/2021 | Brännström et al. |
| 2021/0180630 A1 | 6/2021 | Bruno et al. |
| 2021/0190112 A1 | 6/2021 | Derelöv |
| 2021/0207635 A1 | 7/2021 | Håkansson et al. |
| 2021/0222716 A1 | 7/2021 | Derelöv et al. |
| 2021/0262507 A1 | 8/2021 | Svensson et al. |
| 2021/0262508 A1 | 8/2021 | Svensson et al. |
| 2021/0276108 A1 | 9/2021 | Derelöv et al. |
| 2021/0285480 A1 | 9/2021 | Derelöv et al. |
| 2021/0381251 A1 | 12/2021 | Svensson |
| 2022/0018373 A1 | 1/2022 | Boo |

FOREIGN PATENT DOCUMENTS

| | | |
|---|---|---|
| CH | 685 276 A5 | 5/1995 |
| CH | 696 889 A5 | 1/2008 |
| CH | 698 988 B1 | 12/2009 |
| CH | 705 082 A2 | 12/2012 |
| CN | 101099618 A | 1/2008 |
| CN | 102 917 616 A | 2/2013 |
| CN | 203424576 U | 2/2014 |
| DE | 1107910 B | 5/1961 |
| DE | 24 14 104 A1 | 10/1975 |
| DE | 25 14 357 A1 | 10/1975 |
| DE | 31 03 281 A1 | 8/1982 |
| DE | 228 872 A1 | 10/1985 |
| DE | 42 29 115 A1 | 3/1993 |
| DE | 94 17 168 U1 | 2/1995 |
| DE | 198 31 936 A1 | 2/1999 |
| DE | 298 20 031 U1 | 2/1999 |
| DE | 198 05 538 A1 | 8/1999 |
| DE | 203 04 761 U1 | 4/2004 |
| DE | 299 24 630 U1 | 5/2004 |
| DE | 20 2005 019 986 U1 | 2/2006 |
| DE | 20 2004 017 486 U1 | 4/2006 |
| DE | 20 2009 008 825 U1 | 10/2009 |
| DE | 10 2008 035 293 A1 | 2/2010 |
| DE | 10 2009 041 142 A1 | 3/2011 |
| DE | 10 2011 057 018 A1 | 6/2013 |
| DE | 10 2013 008 595 A1 | 11/2013 |
| DE | 10 2015 103 429 A1 | 10/2015 |
| DE | 10 2014 110 124 A1 | 1/2016 |
| DE | 20 2017 101 856 U1 | 4/2017 |
| EP | 0 060 203 A2 | 9/1982 |
| EP | 0 060 203 A3 | 9/1982 |
| EP | 0 357 129 A1 | 3/1990 |
| EP | 0 362 968 A | 4/1990 |
| EP | 0 675 332 A2 | 10/1995 |
| EP | 0 871 156 A2 | 10/1998 |
| EP | 1 048 423 A2 | 11/2000 |
| EP | 1 048 423 B9 | 5/2005 |
| EP | 1 650 375 A1 | 4/2006 |
| EP | 1 671 562 A1 | 6/2006 |
| EP | 1 650 375 A8 | 9/2006 |
| EP | 1 922 954 A1 | 5/2008 |
| EP | 2 017 403 A2 | 1/2009 |
| EP | 1 922 954 B1 | 7/2009 |
| EP | 2 333 353 A2 | 6/2011 |
| EP | 1 863 984 B1 | 11/2011 |
| EP | 2 487 373 A1 | 8/2012 |
| EP | 3 031 998 A1 | 6/2016 |
| FR | 2 517 187 A1 | 6/1983 |
| FR | 2 597 173 A1 | 10/1987 |
| FR | 2 602 013 A1 | 1/1988 |
| GB | 245332 | 1/1926 |
| GB | 799155 A | 8/1958 |
| GB | 1 022 377 A | 3/1966 |
| GB | 2 163 825 A | 3/1986 |
| GB | 2 315 988 A | 2/1998 |
| GB | 2 445 954 A | 7/2008 |
| GB | 2 482 213 A | 1/2012 |
| GB | 2 520 927 A | 6/2015 |
| JP | S53-113160 U | 9/1978 |
| JP | H06-22606 U | 3/1994 |
| JP | 2003-239921 A | 8/2003 |
| KR | 10-1147274 B1 | 5/2012 |
| KR | 2014-0042314 A | 4/2014 |
| WO | WO 87/07339 A1 | 12/1987 |
| WO | WO 90/07066 | 6/1990 |
| WO | WO 99/22150 A1 | 5/1999 |
| WO | WO 99/41508 A2 | 8/1999 |
| WO | WO 00/66856 A1 | 11/2000 |
| WO | WO 01/53628 A1 | 7/2001 |
| WO | WO 02/055809 A1 | 7/2002 |
| WO | WO 02/055810 A1 | 7/2002 |
| WO | WO 03/083234 A1 | 10/2003 |
| WO | WO 2004/079130 A1 | 9/2004 |
| WO | WO 2005/068747 A1 | 7/2005 |
| WO | WO 2006/043893 A1 | 4/2006 |
| WO | WO 2006/104436 A1 | 10/2006 |
| WO | WO 2007/015669 A2 | 2/2007 |
| WO | WO 2007/015669 A3 | 2/2007 |
| WO | WO 2008/004960 A2 | 1/2008 |
| WO | WO 2008/004960 A3 | 1/2008 |
| WO | WO 2008/004960 A8 | 1/2008 |
| WO | WO 2008/017281 A1 | 2/2008 |
| WO | WO 2008/150234 A1 | 12/2008 |
| WO | WO 2009/136195 A1 | 11/2009 |
| WO | WO 2010/087752 A1 | 8/2010 |
| WO | WO 2011/151758 A2 | 12/2011 |
| WO | WO 2011/151758 A3 | 12/2011 |
| WO | WO 2012/095454 A1 | 7/2012 |
| WO | WO 2012/154113 A1 | 11/2012 |
| WO | WO 2013/009257 A1 | 1/2013 |
| WO | WO 2013/025163 A1 | 2/2013 |
| WO | WO 2013/080160 A1 | 6/2013 |
| WO | WO 2013/118075 A1 | 8/2013 |
| WO | WO 2014/072080 A1 | 5/2014 |
| WO | WO 2014/121410 A1 | 8/2014 |
| WO | WO 2015/015603 A1 | 2/2015 |
| WO | WO 2015/038059 A1 | 3/2015 |
| WO | WO 2015/105449 A1 | 7/2015 |
| WO | WO 2015/105450 A1 | 7/2015 |
| WO | WO 2015/105451 A1 | 7/2015 |
| WO | WO 2016/099396 A1 | 6/2016 |
| WO | WO 2016/175701 A1 | 11/2016 |
| WO | WO 2016/187533 A1 | 11/2016 |
| WO | WO 2017/131574 A1 | 8/2017 |
| WO | WO 2017/138874 A1 | 8/2017 |
| WO | WO 2018/004435 A1 | 1/2018 |
| WO | WO 2018/080387 A1 | 5/2018 |
| WO | WO 2019/125291 A1 | 6/2019 |
| WO | WO 2019/125292 A1 | 6/2019 |

OTHER PUBLICATIONS

U.S. Appl. No. 17/126,518, Peter Derelöv, filed Dec. 18, 2020.
U.S. Appl. No. 16/951,394, Niclas Håkansson and Darko Pervan, filed Nov. 18, 2020.
U.S. Appl. No. 16/953,608, Peter Derelöv, Hans Brännström and Agne Pålsson, filed Nov. 20, 2020.
U.S. Appl. No. 16/946,047, Darko Pervan, filed Jun. 4, 2020.
U.S. Appl. No. 16/915,258, Hans Brännström and Agne Pålsson and Peter Derelöv, filed Jun. 29, 2020.
U.S. Appl. No. 17/398,416, Thomas Meijer, filed Aug. 10, 2021.
International Search Report/Written Opinion dated Apr. 11, 2017 in PCT/SE2017/050067, ISA/SE, Patent-och registreringsverket, Stockholm, SE, 12 pages.
Extended European Search Report issued in EP Application No. 17744648.1, Jul. 8, 2019, European Patent Office, Munich, DE, 9 pages.
U.S. Appl. No. 17/546,356, Peter Derelöv and Hans Brännström, filed Dec. 9, 2021.
U.S. Appl. No. 17/556,146, Christian Boo, filed Dec. 20, 2021.
U.S. Appl. No. 17/665,160, Oscar Rydsjö, Marko Sostar and Patrik Carlsson, filed Feb. 4, 2022.

(56) References Cited

OTHER PUBLICATIONS

U.S. Appl. No. 17/514,055, Marko Sostar, filed Oct. 29, 2021.
U.S. Appl. No. 17/524,293, Hans Brännström, Agne Pålsson and Peter Derelöv, filed Nov. 11, 2021.

PANELS COMPRISING A MECHANICAL LOCKING DEVICE AND AN ASSEMBLED PRODUCT COMPRISING THE PANELS

CROSS REFERENCE TO RELATED APPLICATIONS

The present application is a continuation of U.S. application Ser. No. 15/415,356, filed on Jan. 25, 2017, which claims the benefit of Swedish Application No. 1650089-4, filed on Jan. 26, 2016. The entire contents of each of U.S. application Ser. No. 15/415,356 and Swedish Application No. 1650089-4 are hereby incorporated herein by reference in their entirety.

TECHNICAL FIELD

Embodiments of the present invention relates to panels that may be arranged perpendicular to each other and locked together with a mechanical locking device. The panels may be assembled and locked together to obtain a furniture product, such as a bookshelf, a cupboard, a wardrobe, a box, a drawer or a furniture component. The locking device may comprise a flexible tongue.

BACKGROUND

A furniture product provided with a mechanical locking device is known in the art, as evidenced by WO2015/038059. The furniture comprises a first panel connected perpendicular to a second panel by a mechanical locking device comprising a flexible tongue in an insertion groove.

SUMMARY

One object of certain embodiments of the present invention to provide an improvement over the above described technique and the known art. A specific objective is to improve assembling of panels, such as furniture panels, locked together by a mechanical locking device and/or to increase the strength of the mechanical locking device. The panels may be a part of a furniture product, such as a furniture component, a drawer, a cupboard, a bookshelf, a wardrobe, a kitchen fixture, or a box.

At least some of these and other objects and advantages that will be apparent from the description have been achieved by a first aspect of the invention that includes a set of panels comprising a first panel with a first main plane and a second panel with a second main plane. The first and the second panel are provided with a mechanical locking device for locking a first edge of the first panel to a second edge of the second panel at a junction plane. The first main plane is essentially perpendicular to the second main plane and the junction plane is extending between the first main plane and the second main plane. The first edge comprises an edge tongue that extends from the junction plane. The second edge comprises an edge groove at the junction plane. The edge tongue is configured to cooperate with the edge groove for locking together the first and the second edges in a first direction which is perpendicular to the first main plane. The edge tongue comprises a tongue groove. The edge groove comprises a flexible tongue arranged in an insertion groove. Said flexible tongue is configured to cooperate with the tongue groove for locking together the first and the second edges in a second direction which is perpendicular to the second main plane. The mechanical locking device comprises a first space, between the edge tongue and the edge groove, at an opening of the edge groove and at the junction plane, in a locked position of the first and the second edge. The first space may have the advantage that a loading of a part of the second edge at the opening of the edge groove is avoided. This part of the second edge may be a weak part, since little material is available to absorb a load.

The angle between the junction plane and the first main plane may be in a range of about 30° to about 60°, for example about 45°.

The edge tongue may extend, from the junction plane, essentially in the second direction, and preferably with a longitudinal direction along the first edge.

A first side of the edge tongue may comprise, at the junction plane, a first locking surface. The edge groove, at the junction plane, may comprise a second locking surface. The first locking surface and the second locking surface may be essentially parallel and may be configured to cooperate for locking in the first direction. The first locking surface and the second locking surface are preferably extending essentially in the second direction.

The edge tongue, at a second side, which is opposite the first side, may comprise a third locking surface and the edge groove may comprise a fourth locking surface. The third locking surface and the fourth locking surface may be essentially parallel and may be configured to cooperate, at a distance from the junction plane, for locking in the first direction. The third locking surface and the fourth locking surface are preferably extending essentially in the second direction.

The third locking surface and the fourth locking surface may cooperate at an area, extending in the second direction, over a first distance. The third locking surface and the fourth locking surface may be displaced from the junction plane by a second distance. The first distance may be within the range of about 20% to about 200% of the second distance, preferably within the range of about 50% to about 150% of the second distance. The first distance may be essentially the same as the second distance.

The first side of the edge tongue, at a distance from the junction plane, may comprise a fifth locking surface and the edge groove may comprise a sixth locking surface at a distance from the junction plane. The fifth locking surface and the sixth locking surface may be essentially parallel and may be configured to cooperate for locking in the first direction. The fifth locking surface and the sixth locking surface are preferably extending essentially in the second direction.

The mechanical locking device may comprise a first contact surface at the first edge and a second contact surface at the second edge. The first and the second contact surface may be at an outer corner, in a locked position of the first and the second panel, and may be in the junction plane. The first and the second contact surface may be configured to cooperate.

The mechanical locking device may comprise a second space extending in the junction plane from the first and the second contact surfaces and to an opening of the edge groove.

The first and the second contact surfaces may be configured to cooperate over a first width, in a direction from an inner corner to the outer corner of the first and the second panel, said first width may be in the range of about 5% to about 40%, about 5% to about 30%, or about 5% to about 20% of an edge width of a first and/or second edge surface.

A first edge surface and/or a second edge surface may comprise a recess extending from the first contact surface and the second contact surface, respectively, to the edge tongue and the edge groove, respectively.

The mechanical locking device may comprise a third contact surface at the first edge and a fourth contact surface at the second edge. The third and the fourth contact surface may be at an inner corner in a locked position of the first and the second panel. The third and the fourth contact surface may be in the junction planer and are preferably configured to cooperate.

The third and the fourth contact areas may be cooperating over a second width, in a direction from an inner corner to the outer corner of the first and the second panel. Said second width may be in the range of about 2% to about 20%, about 2% to about 10%, or about 2% to about 5% of an edge width of the first and/or second edge surface.

The first panel may comprise an inner half and an outer half in a direction of the thickness of the first panel. The entire edge tongue is preferably at the inner half of the first panel.

The insertion groove may be parallel to the second main plane or at an acute angle to the second main plane, such that a bottom of the insertion groove is at a greater distance from an inner face of the second panel than an opening of the insertion groove to the edge groove.

The insertion groove may extend along essentially the entire length of the edge groove.

The edge groove may extend along essentially the entire length of the second edge.

The flexible tongue may be displaceable in the insertion groove.

A core material of the first and the second panel may comprise a wood fibre based board, such as a HDF, MDF, plywood, solid wood or particleboard, or a reinforced plastic board or a wood fibre composite board. The core may be provided with a decorative layer.

The locking device may comprise a bevel or rounding at an opening of the tongue groove. This may facilitate disassembling as the bevel or the rounding may prevent that the flexible tongue got stuck during the disassembling.

The locking device is preferably configured such that the flexible tongue moves out of the tongue groove when a tool is inserted into the tongue groove and pushed back into the insertion groove.

The first panel and the second panel are preferably configured to be assembled by displacing the first panel relative the second panel in the second direction, wherein the first panel is perpendicular to the second panel. The edge tongue is inserted into the edge groove, wherein the flexible tongue is pushed back into the insertion groove and springs back into the tongue groove to obtain a locked position.

The flexible tongue may be according to the flexible tongue described and shown in FIGS. 2A-2F or FIGS. 3A-3B in WO2015/105449. FIGS. 2A-2F and FIGS. 3A-3B, and the accompanying disclosure at page 6, line 15 to page 7, line 15, are hereby expressly incorporated by reference herein.

The set of panels may be furniture panels.

A second aspect of the invention includes an assembled furniture product comprising a corner of a frame comprising the set of panels as described above.

BRIEF DESCRIPTION OF THE DRAWINGS

Embodiments of the present invention will by way of example be described in more detail with reference to the appended schematic drawings, in which.

DETAILED DESCRIPTION

Figure 1:
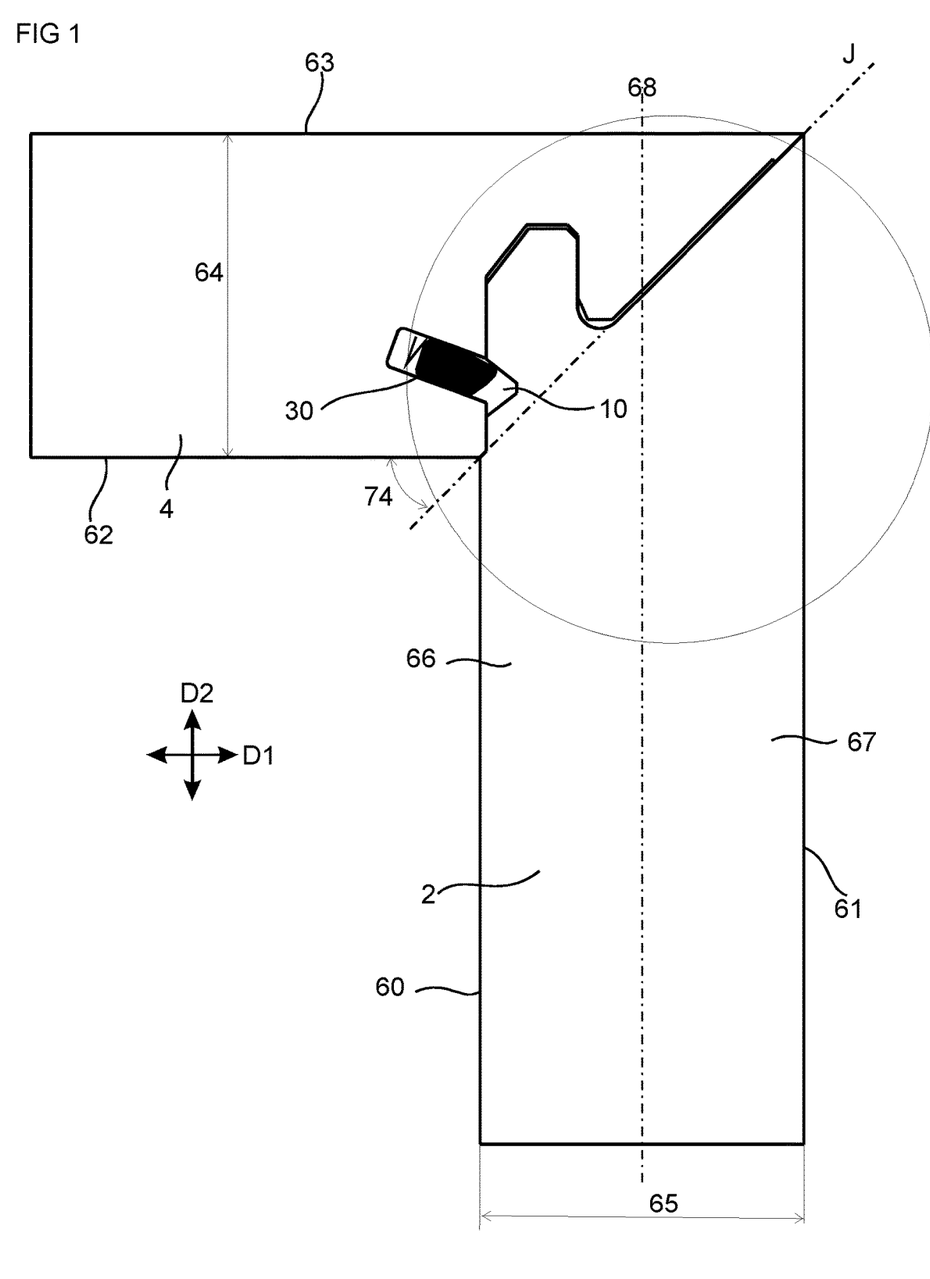
FIG. 1 shows an embodiment of the invention comprising the first panel and the second panel in a locked position.
Figure 2:
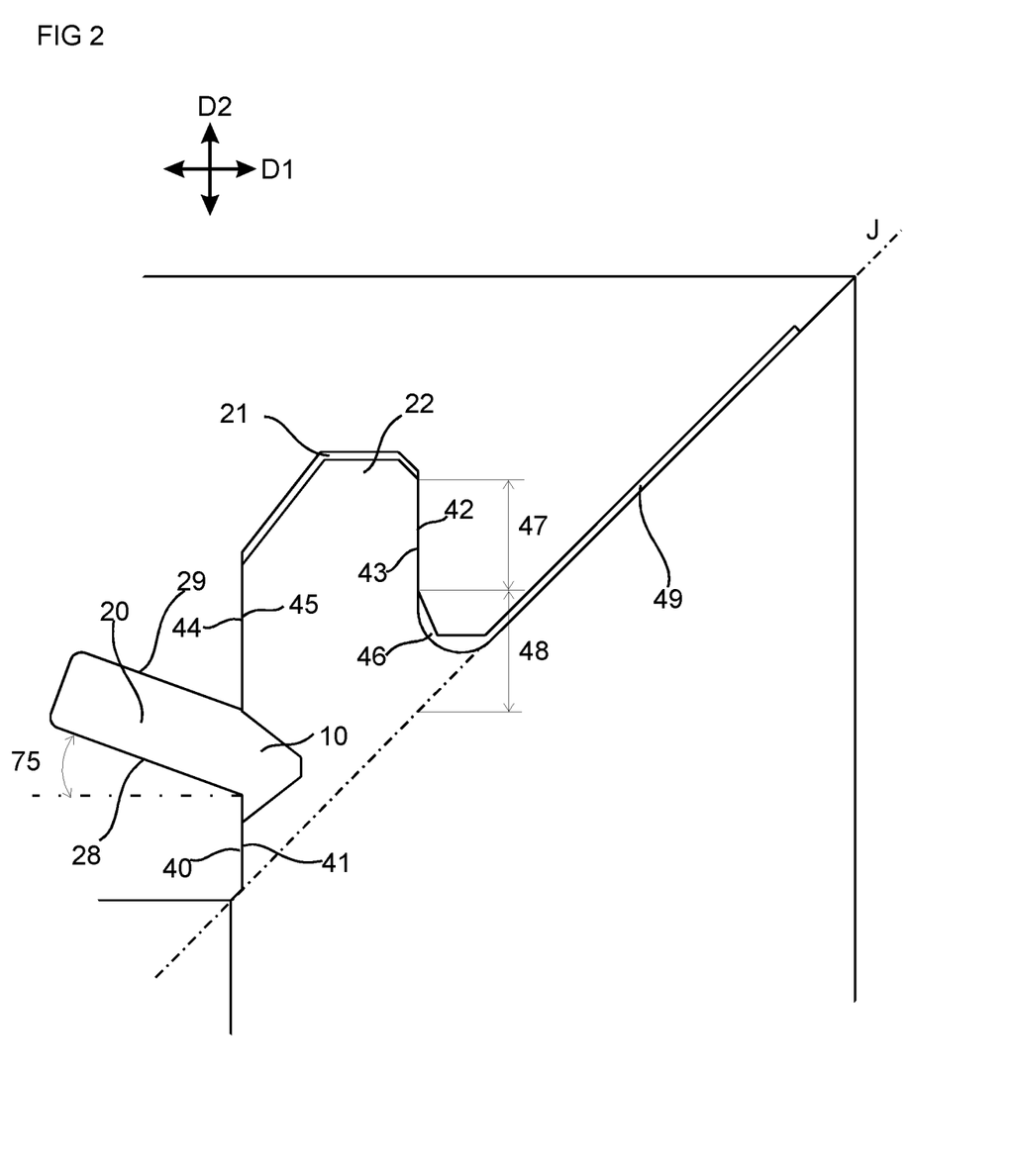
FIG. 2 shows an enlargement of the encircled area in FIG. 1 without the flexible tongue.

FIG. 1 and FIG. 2 show an embodiment including a set of panels comprising a first panel 2 with a first main plane and a second panel 4 with a second main plane. The first and the second panel are provided with a mechanical locking device for locking a first edge of the first panel 2 to a second edge of the second panel 4 at a junction plane J. The first main plane is essentially perpendicular to the second main plane and the junction plane is extending between the first main plane and the second main plane. The panels are shown in a locked position in a crosscut view. A longitudinal direction of the first and the second edge are extending perpendicular to the view shown. The first edge comprises an edge tongue 22 that extends from the junction plane J. The second edge comprises an edge groove 21 at the junction plane, wherein the edge tongue is configured to cooperate with the edge groove for locking together the first and the second edges in a first direction D1 which is perpendicular to the first main plane. The edge tongue 22 comprises a tongue groove 10. The edge groove 21 comprises a flexible tongue 30 arranged in an insertion groove 20, said flexible tongue is configured to cooperate with the tongue groove 10 for locking together the first and the second edges in a second direction D2 which is perpendicular to the second main plane. The mechanical locking device comprises a first space 46 between the edge tongue 22 and the edge groove 21 at an opening of the edge groove 21 and at the junction plane in a locked position of the first and the second edge. The first space 46 may have the advantage that a loading of a part of the second edge at the opening of the edge groove is avoided. This part of the second edge may be a weak part, since little material is available to absorb a load. FIG. 2 shows an enlargement of the encircled area in FIG. 1 without the flexible tongue. The angle 74 between the junction plane and the first main plane may be in a range of about 30° to about 60°, for example about 45°. The edge tongue 22 preferably extends, from the junction plane, essentially in the second direction.

The first panel 2 has a first thickness 65 and the second panel 4 has a second thickness 64. The first and the second thickness may be essentially the same. The first panel 2 comprises an inner half 66, at a first side of a central plane 68 of the first panel, and an outer half 67, at second side of the central plane 68 of the first panel, in a direction of the thickness of the first panel. The entire edge tongue 22 is preferably at the inner half of the first panel. This may have the effect that more material is obtained between the edge groove 21 and an outer corner, in a locked position of the first and the second panel, which may increase the strength of the mechanical locking device. The first panel comprises an inner face 60 and an outer face 61. The second panel comprises an inner face 62 and an outer face 63.

FIG. 2 shows that a first side of the edge tongue 22 may comprise, at or near the junction plane J, a first locking surface 41, and the edge groove 21 may comprises, at or near the junction plane J, a second locking surface 40. The first locking surface and the second locking surface are essentially parallel and are configured to cooperate for locking in the first direction. The first locking surface and the second locking surface are preferably extending essentially in the second direction. The edge tongue 22 at a second side, which is opposite the first side, may comprise a third locking surface 43 and the edge groove 21 may comprise a fourth locking surface 42, wherein the third locking surface and the fourth locking surface are essentially parallel and are configured to cooperate at a distance from the junction plane for locking in the first direction. The third locking surface and the fourth locking surface are preferably extending essentially in the second direction. The first, second, third and fourth locking surfaces may all be parallel to each other. Said parallel first, second, third and fourth locking surfaces may have the advantage that panels are easy to assemble and that, e.g., a furniture comprising said set of panels may be more stable. The fourth locking surface 42 is preferably closer to the central plane 68 than the second locking surface 40.

The third locking surface 43 and the fourth locking surface 42 may cooperate, to absorb a load, at an area extending over a first distance 47 in the second direction. The third locking surface and the fourth locking surface are preferably displaced from the junction plane by a second distance 48. This may have the effect that more material is obtained, in the first direction D1, between the fourth locking surface 42 and the junction plane, which may increase the strength of the mechanical locking device. The first distance 47 may be within the range of about 20% to about 200% of the second distance 48 or within the range of about 50% to about 150% of the second distance 48. The first 47 distance is essentially the same as the second distance 48 in the embodiment shown in FIG. 2.

The first side of the edge tongue 22, at a distance from the junction plane, may comprise a fifth locking surface 45 and the edge groove 21 may comprise a sixth locking surface 44 at a distance from the junction plane J. The fifth locking surface and the sixth locking surface are essentially parallel and are preferably configured to cooperate for locking in the first direction. The fifth locking surface and the sixth locking surface are preferably extending essentially in the second direction. The insertion groove 20 is, in the embodiment shown FIG. 2, positioned between the sixth locking surface 44 and the second locking surface 40. The tongue groove 10 may be positioned between the fifth locking surface 45 and the first locking surface 41.

Figure 3A:
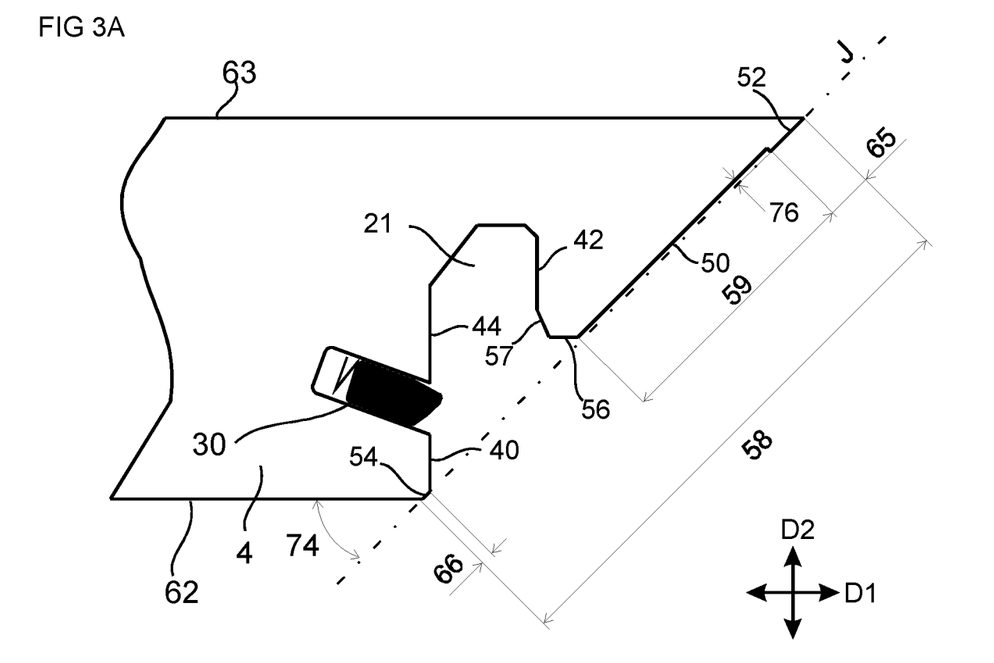
FIGS. 3A-3B show an embodiment of the invention comprising the first edge and the second edge.
Figure 3B:
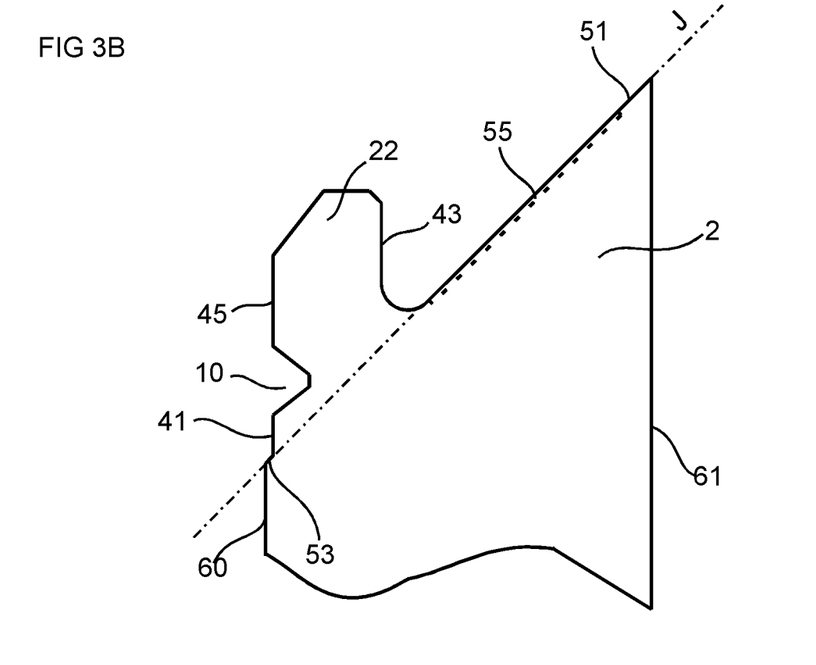

FIG. 3A-3B show an embodiment of the mechanical locking device, before assembling of the first and the second panel, comprising a first contact surface 51 at the first edge and a second contact surface 52 at the second edge. Said first and the second contact surface are at an outer corner, in an assembled and locked position of the first and the second panel, and in the junction plane, and are configured to cooperate. A second space 49 may extend in the junction plane from the first and the second contact surfaces 51,52 and to an opening of the edge groove, see FIG. 2. The second space 49 may extend in a longitudinal direction along the first edge, along the second edge, or along both the first edge and the second edge. The first and the second contact surfaces 51,52 may cooperate over a first width 71, in a direction from an inner corner to the outer corner of the first and the second panel, wherein said first width is in the range of about 5% to about 40%, about 5% to about 30%, or about 5% to about 20% of an edge width 58 of a first and/or second edge surface of the first and the second edge, respectively. This may improve the contact between the first edge surface and the second edge surface, with increased pressure over smaller contacts areas, and irregularities, such as loose fibres that remains from a mechanical cutting of the mechanical locking device, in the first edge surface or the second edge surface are compressed and that a tight joint is obtained between the first and the second panel.

The first edge surface of the first edge may comprise a recess 55, indicated by a dotted line in FIG. 3B, extending from the first contact surface 51 to the edge tongue 22. The second edge surface of the second edge may comprise a recess 50, with a depth 76 and width 59, see FIG. 3A, extending from the second contact surface 52 to the edge groove 21. The depth 76 of the recess 50 of the second edge surface may be about in the range of about 0.1 mm to about 1 mm, preferably in the range of about 0.2 mm to about 0.5 mm. The recess 55 of the first edge surface may have the same depth and essentially the same length as the recess 50 of the first edge surface. The depth of the recess may be adjusted to the material of the core of the panel. Mechanical cutting of e.g. a core of a particle board may result in a rougher surface with protruding fibers than mechanical cutting of e.g. a core of a HDF board. A rougher surface may require an increased depth 76 of the recess of the first edge surface and/or the second edge surface.

The mechanical locking device may comprise a third contact surface 53 at the first edge and a fourth contact surface 54 at the second edge. The third and the fourth contact surfaces are at an inner corner, in a locked position of the first and the second panel, and in the junction plane, and are configured to cooperate. The third and the fourth contact surfaces are cooperating over a second width 72, in a direction from an inner corner to the outer corner of the first and the second panel. The second width 72 may be in the range of about 2% to about 20%, about 2% to about 10%, or about 2% to about 5% of the edge width 58 of the first and/or second edge surface.

The first panel 2 and the second panel 4 are preferably configured to be assembled by displacing the first panel 2 relative the second panel 4 in the second direction D2, wherein the first panel is perpendicular to the second panel. The edge tongue 22 is inserted into the edge groove 21, wherein the flexible tongue 30 is pushed back into the insertion groove and springs back into the tongue groove 10 to obtain a locked position. The set of panels may be furniture panels.

The insertion groove 20 may extend along essentially the entire length of the edge groove.

The edge groove 21 may extend along essentially the entire length of the second edge in a longitudinal direction of the second edge.

The flexible tongue 30 may be displaceable in the insertion groove.

The locking device is preferably configured such that the flexible tongue 30 moves out of the tongue groove 10 when a tool is inserted into the tongue groove and pushed back into the insertion groove.

The insertion groove 20 may be parallel to the second main plane or at an acute angle 75 to the second main plane, such that a bottom of the insertion groove 20 is at a greater distance from an inner face 62 of the second panel than an opening of the insertion groove to the inner face 62.

The locking device may comprise a bevel or rounding at an opening of the tongue groove 10. This may facilitate disassembling as the bevel or the rounding may prevent the flexible tongue from getting stuck during the disassembling.

The set of panels as described above may be a part of an assembled furniture product, such as a corner of a frame. The tongue groove 10 may be open at a backside of the furniture, such that a tool may be inserted into the tongue groove to push back the flexible tongue 30 into the insertion groove 20 and unlock the locking device.

A core material of the first and the second panel may comprise a wood fibre based board, such as a HDF, MDF, plywood, solid wood or particleboard, or a reinforced plastic board or a wood fibre composite board. The core may be provided with a decorative layer or layers. Parts of the locking device may be formed, preferably by mechanical cutting, such as milling, of material of the first and the second panel.

Figure 4A:
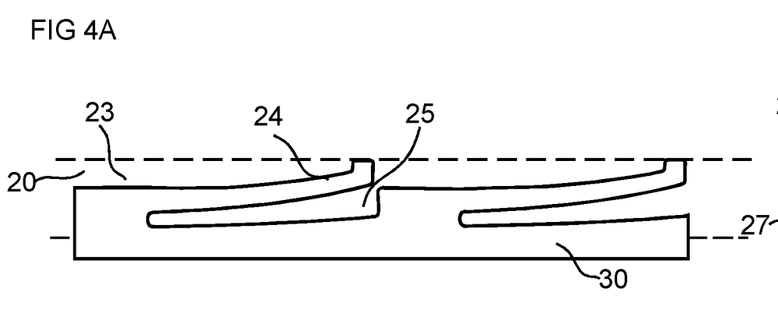
FIGS. 4A-4F show a part of the invention comprising an embodiment of the flexible tongue.
Figure 4B:
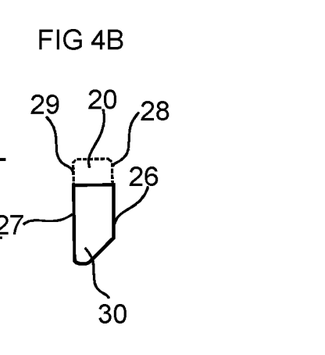
Figures 4C, 4D:
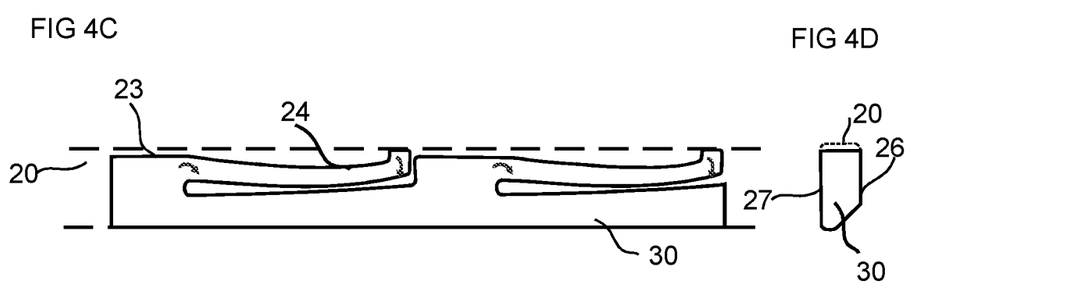

An embodiment of the flexible tongue 30, which is displaceable in an insertion groove 20, is shown in FIGS. 4A-4D. FIGS. 4A-4B show the flexible tongue 30 in a locked position and FIGS. 4C-4D show the flexible tongue 30 during assembling of the first panel 2 and the second panel 4. FIG. 4B shows a cross section of the flexible tongue 30 in FIG. 4A. FIG. 4D shows a cross section of the flexile tongue 30 in FIG. 4C. The flexible tongue 30 comprises bendable protruding parts 24. A space 23 is provided between the flexible tongue 30 and a bottom wall of the insertion groove 20. FIG. 4C shows that the flexible tongue 30 is pushed into the insertion groove 20 and towards the bottom wall of the insertion groove 20 during an assembly of the first panel 2 with the second panel 4. The flexible tongue 30 springs back toward its initial position when the first panel 2 and the second panel 4 have reached a locked position. A recess 25 is preferably arranged at each bendable protruding part.

The flexible tongue 30 may have a first displacement surface 26 and an opposite second displacement surface 27, configured to be displaced along a third displacement surface 28 and a fourth displacement locking surface 29, respectively, of the insertion groove 20.

Figure 4E:
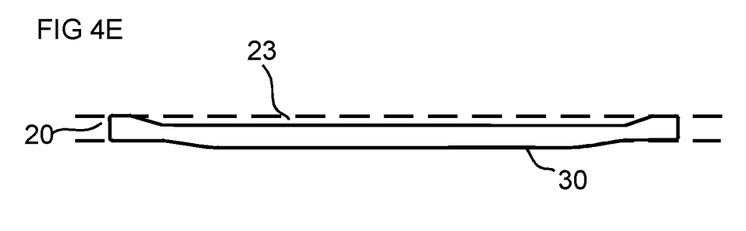
Figure 4F:
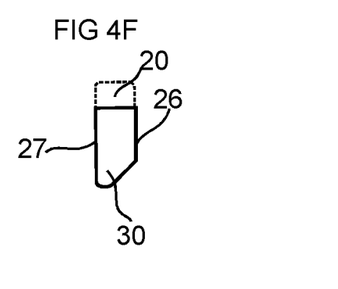

An alternative embodiment of the flexible tongue 30, without the protruding bendable parts 24, is shown in FIGS. 4E-4F. FIG. 4F shows a cross section of the flexible tongue 30 shown in FIG. 4E. The alternative embodiment is bendable in its length direction in order to accomplish a similar function as the embodiment shown in FIGS. 4A-4D.

When the word "about" is used in this specification in connection with a numerical value, it is intended that the associated numerical value include a tolerance of ±10% around the stated numerical value.

Embodiments

1. A set of panels comprising a first panel (2) with a first main plane and a second panel (4) with a second main plane, wherein the first panel and the second panel are provided with a mechanical locking device for locking a first edge of the first panel (2) to a second edge of the second panel (4) at a junction plane (J), wherein the first main plane is essentially perpendicular to the second main plane and the junction plane is extending between the first main plane and the second main plane, characterized in that:
the first edge comprises an edge tongue (22) that extends beyond the junction plane (J),
the second edge comprises an edge groove (21) at the junction plane, wherein the edge tongue is configured to cooperate with the edge groove for locking together the first and the second edges in a first direction (D1) which is perpendicular to the first main plane,
the edge tongue (22) comprises a tongue groove (10),
the edge groove (21) comprises a flexible tongue (30) arranged in an insertion groove (20), said flexible tongue is configured to cooperate with the tongue groove (10) for locking together the first and the second edges in a second direction (D2) which is perpendicular to the second main plane,
the mechanical locking device comprises a first space (46) between the edge tongue (22) and the edge groove (21) at an opening of the edge groove (21) and at the junction plane in a locked position of the first and the second edge.

2. The set of panels as in embodiment 1, wherein the angle (74) between the junction plane and the first main plane is about 45°.

3. The set of panels as in embodiment 1 or 2, wherein edge tongue (22) extends, from the junction plane, essentially in the second direction.

4. The set of panels as in any one of the preceding embodiments, wherein a first side of the edge tongue (22) comprises, at or near the junction plane (J), a first locking surface (41), and the edge groove (21) comprises, at or near the junction plane (J), a second locking surface (40), wherein the first locking surface and the second locking surface are essentially parallel and are configured to cooperate for locking in the first direction, the first locking surface and the second locking surface are preferably extending essentially in the second direction.

5. The set of panels as in any one of the preceding embodiments, wherein the edge tongue (22) at a second side, which is opposite the first side, comprises a third locking surface (43) and the edge groove (21) comprises a fourth locking surface (42), wherein the third locking surface and the fourth locking surface are essentially parallel and are configured to cooperate at a distance from the junction plane for locking in the first direction, the third locking surface and the fourth locking surface preferably extend essentially in the second direction.

6. The set of panels as in embodiment 5, wherein the third locking surface (43) and the fourth locking surface (42) cooperate at an area extending over a first distance (47) in the second direction, wherein the third locking surface and the fourth locking surface are displaced from the junction plane by a second distance (48), wherein the first distance (47) is within the range of about 20% to about 200% of the second distance (48) or within the range of about 50% to about 150% of the second distance (48).

7. The set of panels as in any one of the preceding embodiments, wherein the first side of the edge tongue (22), at a distance from the junction plane, comprises a fifth locking surface (45) and the edge groove (21) comprises a sixth locking surface (44) at a distance from the junction plane (J), wherein the fifth locking surface and the sixth locking surface are essentially parallel and are configured to cooperate for locking in the first direction, the fifth locking surface and the sixth locking surface preferably extend essentially in the second direction.

8. The set of panels as in any one of the preceding embodiments, wherein the mechanical locking device comprises a first contact surface (51) at the first edge and a second contact surface (52) at the second edge, the first contact surface and the second contact surface are at an outer corner, in a locked position of the first and the second panel, and in the junction plane and are configured to cooperate.

9. The set of panels as in embodiment 8, wherein the mechanical locking device comprises a second space (49) extending in the junction plane from the first and the second contact surfaces (51,52) and to an opening of the edge groove.

10. The set of panels as in embodiment 8 or 9, wherein the first and the second contact surfaces (51,52) are cooperating over a first width (71), in a direction from an inner corner to the outer corner of the first and the second panel, wherein said first width is in the range of about 5% to about 40%, about 5% to about 30%, or about 5% to about 20% of an edge width (58) of the first and/or second edge surface.

11. The set of panels as in any one of the embodiments 8-10, wherein the first edge surface and/or the second edge surface comprises a recess (50,55) extending from the first contact surface (51) and the second contact surface (52), respectively, to the edge tongue (22) and the edge groove (21), respectively.

12. The set of panels as in any one of the preceding embodiments, wherein the mechanical locking device comprises a third contact surface (53) at the first edge and a fourth contact surface (54) at the second edge, the third and the fourth contact surface are at an inner corner, in a locked position of the first and the second panel, and in the junction plane, and are configured to cooperate.

13. The set of panels as in embodiment 12, wherein the third and the fourth contact areas are cooperating over a second width (72), in a direction from an inner corner to the outer corner of the first and the second panel, said second width may be in the range of about 2% to about 20%, about 2% to about 10%, or about 2% to about 5% of an edge width (58) of the first and/or second edge surface.

14. The set of panels as in any one of the preceding embodiments, wherein the first panel comprises an inner half (66) and an outer half (67) in a direction of a thickness of the first panel, wherein the entire edge tongue (22) is at the inner half of the first panel.

The invention claimed is:

1. A set of panels forming a corner joint having an inner corner and an outer corner, the set comprising a first panel with a first main plane and a second panel with a second main plane, wherein the first panel and the second panel are provided with a mechanical locking device for locking a first edge of the first panel to a second edge of the second panel at a junction plane, wherein the first main plane is essentially perpendicular to the second main plane and the junction plane is extending between the first main plane and the second main plane, wherein the first edge comprises an edge tongue that extends beyond the junction plane, wherein the second edge comprises an edge groove at the junction plane, wherein the edge tongue is configured to cooperate with the edge groove for locking together the first and the second edges in a first direction which is perpendicular to the first main plane, wherein the edge tongue comprises a tongue groove between the edge groove and the inner corner, wherein the edge groove comprises a flexible tongue arranged in an insertion groove, said flexible tongue is configured to cooperate with the tongue groove for locking together the first and the second edges in a second direction which is perpendicular to the second main plane, wherein the mechanical locking device comprises a first space between the edge tongue and the edge groove at an opening of the edge groove and at the junction plane between the edge tongue and the outer corner in a locked position of the first and the second edge, wherein the angle between the junction plane and the first main plane is about 45 degrees, wherein the mechanical locking device comprises a first contact surface at the first edge and a second contact surface at the second edge, the first contact surface and the second contact surface are at the outer corner, in a locked position of the first and the second panel, and in the junction plane and are configured to cooperate, and wherein a second edge surface of the second edge comprises a recess extending from the second contact surface to the edge groove to create to a second space extending in the junction plane from the first and the second contact surfaces and to the opening of the edge groove.

2. The set of panels as claimed in claim 1, wherein edge tongue extends, from the junction plane, essentially in the second direction.

3. The set of panels as claimed in claim 1, wherein a first side of the edge tongue comprises, at or near the junction plane, a first locking surface, and the edge groove comprises, at or near the junction plane, a second locking surface, wherein the first locking surface and the second locking surface are essentially parallel and are configured to cooperate for locking in the first direction.

4. The set of panels as claimed in claim 3, wherein the edge tongue at a second side, which is opposite the first side, comprises a third locking surface and the edge groove comprises a fourth locking surface, wherein the third locking surface and the fourth locking surface are essentially parallel and are configured to cooperate at a distance from the junction plane for locking in the first direction.

5. The set of panels as claimed in claim 4, wherein the third locking surface and the fourth locking surface cooperate at an area extending over a first distance in the second direction, wherein the third locking surface and the fourth locking surface are displaced from the junction plane by a second distance, wherein the first distance is within the range of about 20% to about 200% of the second distance.

6. The set of panels as claimed in claim 5, wherein the first side of the edge tongue, at a distance from the junction plane, comprises a fifth locking surface and the edge groove comprises a sixth locking surface at a distance from the junction plane, wherein the fifth locking surface and the sixth locking surface are essentially parallel and are configured to cooperate for locking in the first direction.

7. The set of panels as claimed in claim 1, wherein the first and the second contact surfaces are cooperating over a first width, in a direction from the inner corner to the outer corner, wherein said first width is in the range of about 5% to about 40% of an edge width of the first and/or second edge surface.

8. The set of panels as claimed in claim 1, wherein the mechanical locking device comprises a third contact surface at the first edge and a fourth contact surface at the second edge, the third and the fourth contact surface are at the inner corner, in a locked position of the first and the second panel, and in the junction plane, and are configured to cooperate.

9. The set of panels as claimed in claim 8, wherein the third and the fourth contact surfaces are cooperating over a second width, in a direction from h inner corner to the outer corner, wherein said second width is in the range of about 2% to about 20% of an edge width of the first and/or second edge surface.

10. The set of panels as claimed in claim 1, wherein the first panel comprises an inner half and an outer half in a direction of a thickness of the first panel, wherein the entire edge tongue is at the inner half of the first panel.

11. The set of panels as claimed in claim 1, wherein a first edge surface of the first edge comprises another recess extending from the first contact surface to the edge tongue.

* * * * *

UNITED STATES PATENT AND TRADEMARK OFFICE
CERTIFICATE OF CORRECTION

| | |
|---|---|
| PATENT NO. | : 11,445,820 B2 |
| APPLICATION NO. | : 16/722096 |
| DATED | : September 20, 2022 |
| INVENTOR(S) | : Peter Derelov et al. |

Page 1 of 1

It is certified that error appears in the above-identified patent and that said Letters Patent is hereby corrected as shown below:

In the Claims

Column 10, Lines 10-11, Claim 2:
"wherein edge tongue"
Should read:
-- wherein the edge tongue --

Column 10, Line 55, Claim 9:
"from h inner corner"
Should read:
-- from the inner corner --

Signed and Sealed this
Second Day of September, 2025

Coke Morgan Stewart
*Acting Director of the United States Patent and Trademark Office*